United States Patent

Furukawa et al.

[11] Patent Number: 5,959,057
[45] Date of Patent: Sep. 28, 1999

[54] POLYORGANOSILOXANE AND METHOD FOR THE PREPARATION THEREOF

[75] Inventors: Haruhiko Furukawa, Chiba Prefecture; Koji Nakanishi, Kanagawa Prefecture, both of Japan

[73] Assignee: Dow Corning Toray Silicone Co., Ltd., Tokyo, Japan

[21] Appl. No.: 09/009,150

[22] Filed: Jan. 20, 1998

[30] Foreign Application Priority Data

Jan. 21, 1997 [JP] Japan ..................................... 9-023131
Jan. 21, 1997 [JP] Japan ..................................... 9-023132

[51] Int. Cl.⁶ .......................... C08G 77/06; C08G 77/14; C08G 77/26
[52] U.S. Cl. ............................. 528/26; 528/38; 556/440; 556/411; 556/446; 556/449
[58] Field of Search ........................ 528/26, 28; 556/440, 556/411, 446, 449

[56] References Cited

U.S. PATENT DOCUMENTS

| | | | |
|---|---|---|---|
| 3,579,467 | 5/1971 | Brown | 252/46.3 |
| 4,395,527 | 7/1983 | Berger | 528/26 |
| 4,698,270 | 10/1987 | Varaprath | 427/35 |
| 4,724,248 | 2/1988 | Dexter et al. | 524/262 |
| 5,200,284 | 4/1993 | Chen et al. | 430/33 |
| 5,480,936 | 1/1996 | Mueller et al. | 525/479 |

FOREIGN PATENT DOCUMENTS

| | | |
|---|---|---|
| 47-3922 | 2/1972 | Japan . |
| 4-247091 | 4/1992 | Japan . |
| 7-42472 | 5/1995 | Japan . |

*Primary Examiner*—Jeffrey T. Smith
*Assistant Examiner*—Caixia Lu-Rutt
*Attorney, Agent, or Firm*—Alex Weitz

[57] ABSTRACT

There is disclosed a polyorganosiloxane and a method for the preparation thereof, said polyorganosiloxane having the formula

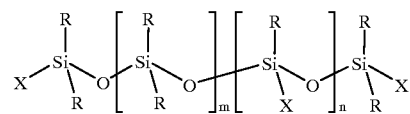

in which R is independently selected from substituted or unsubstituted monovalent hydrocarbon groups, m is an integer having a value of 0 to 500, n is an integer having a value of 0 to 500 and X is selected from a substituted or an unsubstituted monovalent hydrocarbon group or a hindered phenol group which is linked through either a carboxylate ester or an amide moiety, with the proviso that at least one of the X groups is said hindered phenol group.

7 Claims, No Drawings

POLYORGANOSILOXANE AND METHOD FOR THE PREPARATION THEREOF

FIELD OF THE INVENTION

This invention relates to a novel polyorganosiloxane and to a method for its preparation. More particularly, this invention relates to a novel polyorganosiloxane in which hindered phenol functionality is linked through a carboxylate ester moiety or an amide moiety into a pendant or molecular chain terminal position. The invention also relates to a method for the preparation of this novel polyorganosiloxane.

BACKGROUND OF THE INVENTION

Polyorganosiloxanes having hindered phenol functionality (hindered denotes the presence of sterically hindering groups) are known in the art For example, Japanese Patent Publication (Kokoku) Number Sho 47-3922 (3,922/1972) discloses polyorganosiloxane with the formula

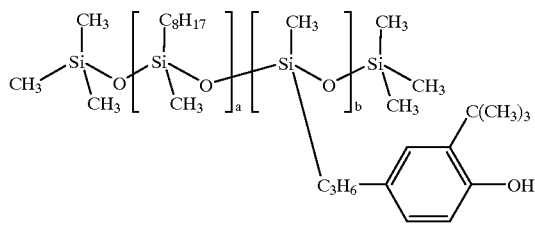

while Japanese Patent Application Laid Open (Kokai or Unexamined) Number Hei 4-247091 (247,091/1992) disclose polyorganosiloxane with the following formula.

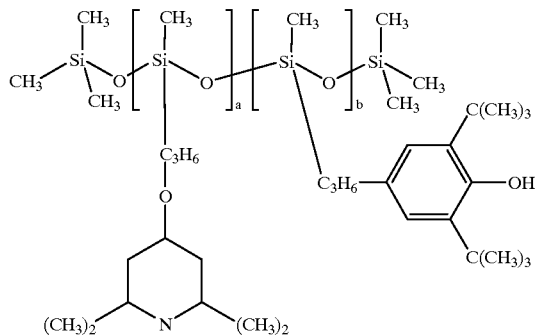

Other examples are disclosed in Japanese Patent Publication (Kokoku) Number Hei 7-42472 (42,472/1995). However, the hindered phenol functionality is liked across alkylene in each of these polyorganosiloxanes, and polyorganosiloxane containing hindered phenol functionality linked across a carboxylate ester or amide moiety is heretofore unknown.

SUMMARY OF THE INVENTION

An object of the present invention is to provide a novel polyorganosiloxane that bears carboxylate ester-linked or amide-linked hindered phenol functionality in a pendant or molecular chain terminal position. An additional object of the present invention is to provide a method for preparing this novel polyorganosiloxane.

The present invention, therefore, relates to a polyorganosiloxane with the general formula

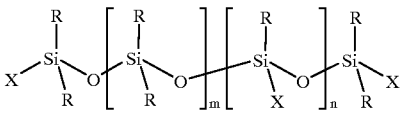

(i)

in which R is selected from substituted or unsubstituted monovalent hydrocarbon groups; X is a substituted or unsubstituted monovalent hydrocarbon group or a phenol group having a formula selected from

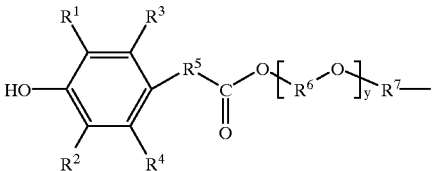

(ii)

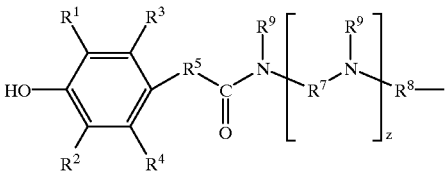

(iii)

where $R^1$, $R^2$, $R^3$, and $R^4$ are selected from the hydrogen atom or $C_1$ to $C_6$ alkyl wherein at least one of $R^1$ and $R^2$ is alkyl; $R^5$, $R^6$, $R^7$ and $R^8$ are selected from $C_2$ to $C_{10}$ alkylene; y is an integer from 0 to 50, z is an integer having a value of 0 to 10, $R^9$ is selected from hydrogen or a $C_1$, to $C_{10}$ monovalent hydrocarbon group, at least one of the groups X is said phenol group, and m and n are each integers having a value of 0 to 500.

DETAILED DESCRIPTION OF THE INVENTION

The polyorganosiloxane according to the present invention is defined by the following general formula.

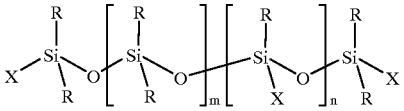

(i)

The groups R in this formula are independently selected from substituted or unsubstituted monovalent hydrocarbon groups. These substituted and unsubstituted monovalent hydrocarbon groups are specifically exemplified by alkyl such as methyl, ethyl, propyl, butyl, pentyl, hexyl, and so forth; aryl such as ,phenyl, tolyl, xylyl, and so forth; aralkyl such as benzyl, phenethyl, and so forth; haloalkyl such as 3,3,3-trifluoropropyl and so forth; and alkenyl such as vinyl, propenyl, butenyl, hexenyl, and so forth. When the hindered phenol is linked by a carboxylate ester group, X in the above formula is a substituted or unsubstituted monovalent hydrocarbon group or a phenol group with the following formula

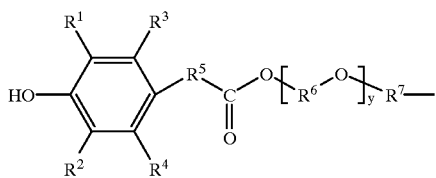

(iv)

Wherein at least one of the groups X must be a phenol group according to formula (iv). The substituted and unsubstituted monovalent hydrocarbon groups encompassed by X are exemplified by the same groups as for R above. $R^1$, $R^2$, $R^3$, and $R^4$ in the subject phenol group are in each case selected from the hydrogen atom or $C_1$ to $C_6$ alkyl wherein at least one of $R^1$ or $R^2$ is alkyl. The alkyl making up at least one of $R^1$ or $R^2$ is specifically exemplified by methyl, ethyl, propyl, isopropyl, butyl, isobutyl and tert-butyl; it is preferably a group —$C(R^{10})_3$ in which $R^{10}$ is $C_1$ to $C_3$ alkyl; and it is preferably tert-butyl. $R^5$, $R^6$, and $R^7$ are in each case selected from $C_2$ to $C_{10}$ alkylene, for example, ethylene, propylene, and butylene. The subscript y is an integer having a value of 0 to 50. The subscripts m and n are each integers having a value of 0 to 500. As an example, when n=0, at least one of the groups X bonded at the molecular chain terminals in the preceding formula must be the above-described phenol group according to formula (iv).

The polyorganosiloxane having a carboxylate ester-linked phenol according to the present invention is exemplified by compounds with the following formulas.

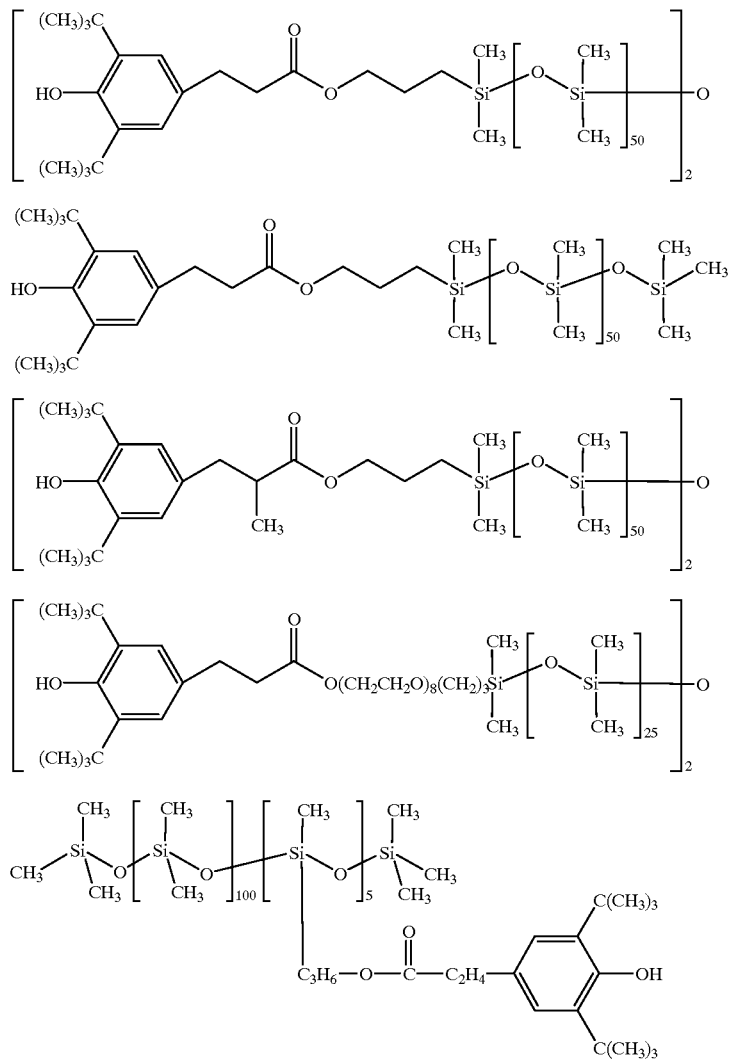

-continued

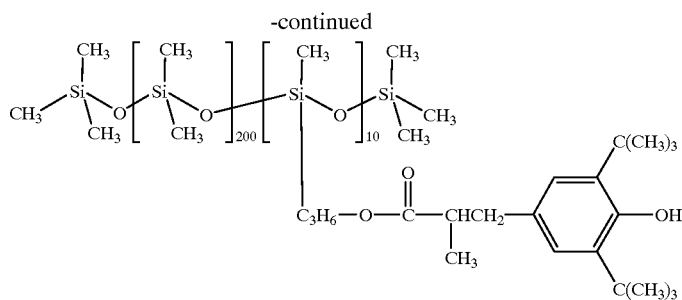

and

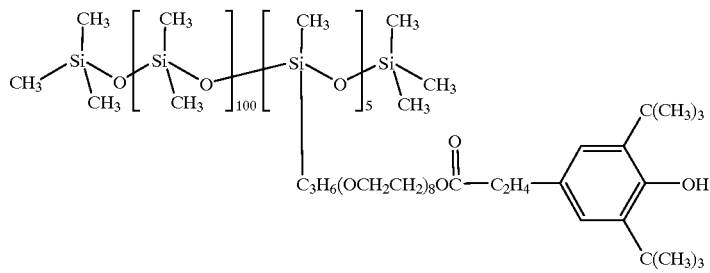

The above polyorganosiloxane can be synthesized, for example, by condensation reacting
(A) a polyorganosiloxane of the formula

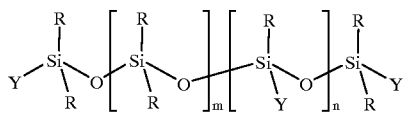

(v)

with
(B) a phenol group-containing carboxylic acid or derivative thereof the following formula

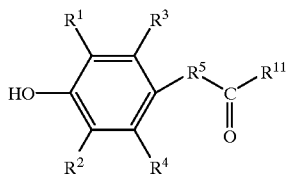

(vi)

The polyorganosiloxane (A) used in this preparative method has the general formula given above, wherein R has its previously defined meaning. Y is a substituted or unsubstituted monovalent hydrocarbon group or a carbinol group of the formula $$-R^7-(OR^6)_yOH \qquad \text{(vii)}$$

wherein at least one of the groups Y in formula (v) must be the above-defined carbinol group. $R^6$ and $R^7$ in formula (vii) are as previously defined. The subscript y is an integer having a value of 0 to 50, while the subscripts m and n are as previously defined.

Component (B) is a phenol-functional carboxylic acid or derivative thereof with the general formula (vi) $R^1$, $R^2$, $R^3$, and R4 in the preceding formula are selected from the hydrogen atom and $C_1$ to $C_6$ alkyl with the proviso that at least one of $R^1$ or $R^2$ must be the above-described alkyl. $R^5$ represents $C_2$ to $C_{10}$ alkylene, for which specific examples are ethylene, propylene, and butylene. $R^{11}$ is selected from the hydroxyl group, alkoxy groups, or halogen atoms, wherein the alkoxy preferably contains no more than 6 carbons. The halogen atoms are exemplified by chlorine, bromine, and iodine. Among the compounds encompassed by component (B) in this embodiment, the phenol-functional carboxylic acid halides ($R^{11}$=halogen atom) are preferred. The subject phenol-functional carboxylic acid halides can be synthesized by first hydrolyzing the phenol-functional carboxylate ester ($R^{11}$=alkoxy) into carboxylic acid with the formula

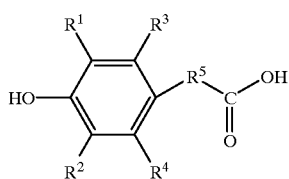

and then converting this carboxylic acid into the acid halide.

A condensation-reaction catalyst can be used in the preparative method according to the present invention on an optional basis. The condensation-reaction catalyst is specifically exemplified by acidic catalysts such as toluenesulfonic acid and by basic catalysts such as NaH (sodium hydride). The condensaton reaction under consideration is generally run with heating.

When the hindered phenol functionality is linked through an amide group, X in formula (i) is a substituted or unsubstituted monovalent hydrocarbon group, as described above, or a phenol group having the formula

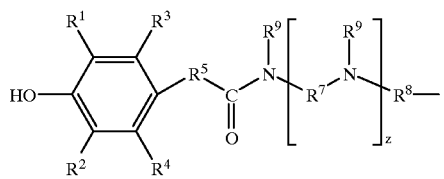

wherein at least one of the groups X in formula (i) must be the phenol group according to formula (viii). The substituted and unsubstituted monovalent hydrocarbon groups in this case are again exemplified by the same groups as for R above. $R^1$, $R^2$, $R^3$, and $R^4$ in formula (viii) are as previously defined, wherein at least one of $R^1$ or $R^2$ is alky. $R^5$, $R^7$, and $R^8$ are also as previously defined. $R^9$ is the hydrogen atom or a $C_1$ to $C_{10}$ monovalent hydrocarbon group, for which specific examples are alkyl such as methyl, ethyl, propyl, and so forth and aryl such as phenyl and the like. The subscript z is an integer having a value of 0 to 10. The subscripts m and n are each integers having a value of 0 to 500. As an example, when n=0, at least one of the groups X bonded at the molecular chain terminals in the preceding formula must be the above-described phenol group according to formula (viii).

The amide-linked polyorganosiloxane according to the present invention is exemplified by compounds with the following formulas.

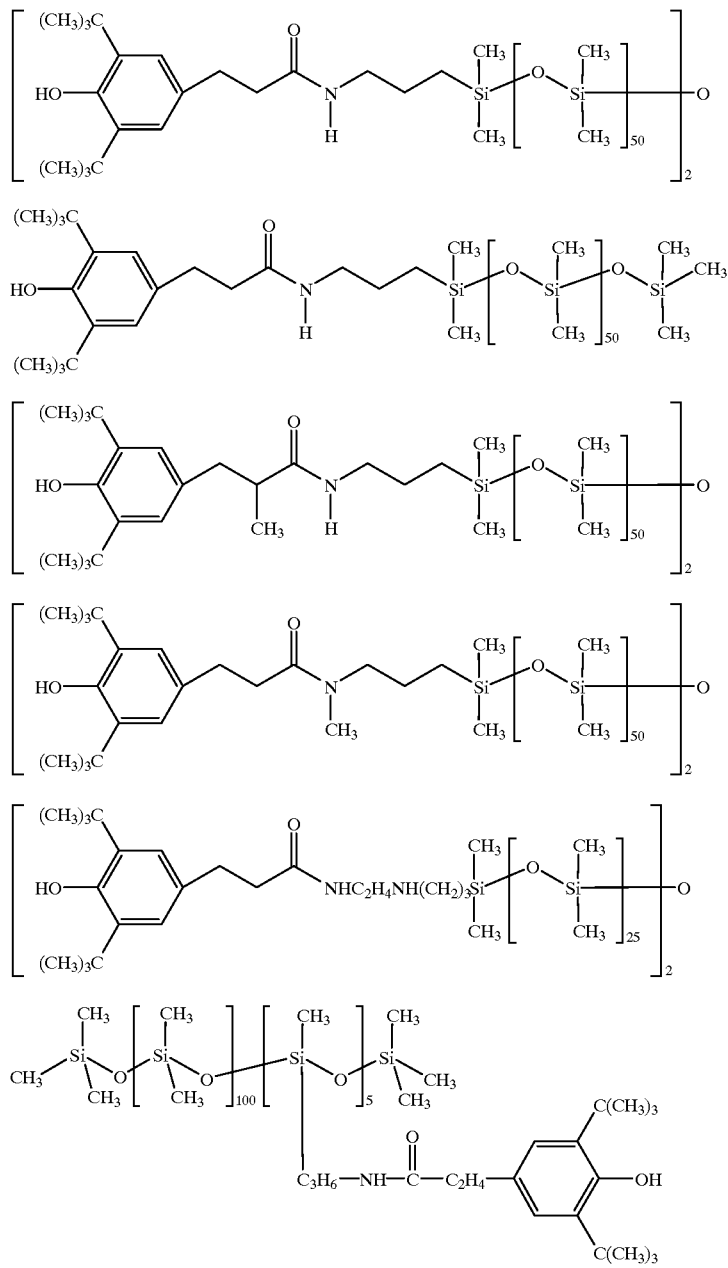

-continued

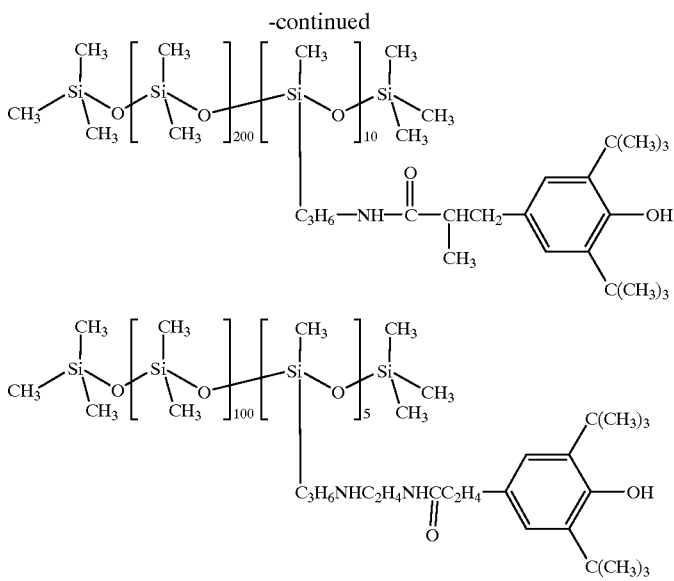

The amide-linked polyorganosiloxane can be synthesized, for example, by condensation reacting
(A) an polyorganosiloxane with the general formula

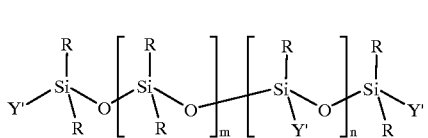

(ix)

with
(B) a phenol group-containing carboxylic acid or a derivative thereof according to formula (vi), above.

The polyorganosiloxane ($A^1$) used in this preparative method has the general formula (ix) wherein R is as defined above. $Y^1$ is a substituted or unsubstituted monovalent hydrocarbon group or the amino group —$R^8$—($NR^9$—$R^7$)$_z$—$NHR^9$ in which $R^9$ represents the hydrogen atom or a $C_1$ to $C_{10}$ monovalent hydrocarbon group, $R^7$ and $R^8$ are as defined previously and z is an integer having a value of from 0 to 10. At least one of the groups $Y^1$ in the preceding formula must be the above-defined amino group. The monovalent hydrocarbon groups encompassed by $R^9$ are specifically exemplified by alkyl such as methyl, ethyl, propyl, and so forth and by aryl such as phenyl and so forth. $R^7$ and $R^8$ are exemplified by ethylene, propylene, butylene, and so forth. The subscripts m and n are each integers having a value of 0 to 500.

Component (B) as described above (formula vi). In this embodiment, the phenol-functional carboxylic acids ($R^{11}$=hydroxyl) and phenol-functional carboxylic acid halides ($R^{11}$=halogen atom) are preferred. The subject phenol-functional carboxylic acids can be synthesized by hydrolyzing the corresponding phenol-functional carboxylate ester ($R^{11}$=alkoxy), while the phenol-functional carboxylic acid halides can be synthesized by converting the phenol-functional carboxylic acids into the acid halide.

As described above, a condensation-reaction catalyst can be used in the preparative method according to this embodiment of the present invention on an optional basis.

The polyorganosiloxane according to the present invention is well-suited for application as a lubricant or a resin-improving additive.

EXAMPLES

The invention is explained in greater detail below using working examples. The viscosity values reported in the examples were measured at 25° C.

EXAMPLE 1

Operating under a nitrogen current, 29.8 g of methyl 3-(3',5'-di-tert-butylhydroxyphenyl)propionate, 80 mL of ethanol, and 6 g of sodium hydroxide were introduced in a 0.5-L four-neck flask equipped with a stirrer, addition funnel, and thermometer and were stirred for 1 hour while heating under reflux. After completion of the stirring period, the ethanol was removed by distillation and the reaction mass was then neutralized by the gradual addition of concentrated hydrochloric acid. 150 mL of a 1:1 liquid mixture of toluene and ethyl acetate was added followed by washing twice with water. The solvent was subsequently distilled from the washed organic layer to give 27.2 g of 3-(3',5'-di-text-butylhydroxyphenyl)propionic acid in crystalline form. Then, while operating under a nitrogen current, 8.0 g of this 3-(3',5'-di-tert-butylhydroxyphenyl)propionic acid and 50 mL of dry toluene were introduced into a 0.2-L four-neck flask equipped with a stirrer, addition funnel, and thermometer and were stirred. After completion of stirring, 4 g of thionyl chloride was added dropwise at room temperature from the addition funnel. The reaction solution was then heated to 70° C. and a reaction was run for 4 hours with stirring. After completion of the reaction, the by-products were distilled under reduced pressure from the reaction solution to give 8.1 g of 3-(3',5'-di-tert-butylhydroxyphenyl) propionyl chloride in crystalline form.

While operating under a nitrogen current, 50 mL of toluene and 11.1 g of polydimethylsiloxane with the formula

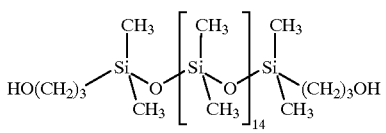

were introduced into a 0.2-L four-neck flask equipped with a stirrer, addition funnel, and thermometer and were azeotropically dried. This was followed by the addition of 4 mL of triethylamine; then the addition of 5.0 g of the 3-(3',5'-di-tert-butylhydroxyphenyl)propionyl chloride synthesized as described above; and reaction for 3 hours while stirring at 50° C. After completion of the reaction, 50 mL of water was added to dissolve the salt that had precipitated in the reaction solution. The organic phase was washed twice with water, and the solvent was then distilled from the organic phase to give 12.0 g of a transparent yellow liquid. This liquid had a viscosity of 70 centistokes. This liquid was analyzed by IR spectroscopy and $^{13}$C-NMR spectroscopy. Absorption at 1,735 cm$^{-1}$ originating with the ester group and absorption at 3,650 cm$^{-1}$ orginating with the phenol group were observed. The analytical results confirmed the product liquid to be a polyorganosiloxane with the following structural formula.

50 mL of xylene, and 3.0 g of the 3-(3',5'-di-tert-butylhydroxyphenyl)propionic acid whose synthesis is described above. A reaction was run by stirring for 2 hours using azeotropic dehydration conditions. After completion of the reaction, the solvent was distilled out to give 27.6 g of a transparent, viscous, yellowish-brown liquid. This liquid had a viscosity of 2,100 centistokes and was analyzed by IR spectroscopy and $^{13}$C-NMR spectroscopy. The absorption at 1,650 cm$^{-1}$ assigned to the amide group and the absorption at 3,650 cm$^{-1}$ assigned to the phenol group were observed. The analytical results confirmed the product liquid to be a polyorganosiloxane with the following structural formula.

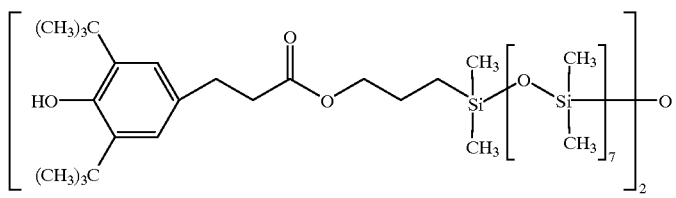

EXAMPLE 2

Operating under a nitrogen current, 29.8 g of methyl 3-(3',5'-di-tert-butylhydroxyphenyl)propionate, 80 mL of ethanol, and 6 g of sodium hydroxide were introduced into

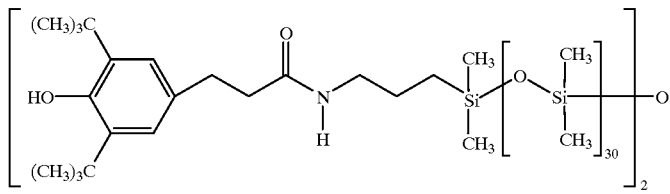

a 0.5-L four-neck flask equipped with a stirrer, addition funnel, and thermometer and were stirred for 1 hour while heating under reflux. After the completion of the stirring period, the ethanol was removed by distillation and the reaction mass was then neutralized by the gradual addition of concentrated hydrochloric acid. 150 mL of a 1:1 liquid mixture of toluene and ethyl acetate was added followed by washing twice with water. The solvent was then distilled from the washed organic layer to give 27.2 g of 3-(3',5'-di-tert-butylhydroxyphenyl)propionic acid in crystalline form.

Then, while operating under a nitrogen current, the following were introduced into a 0.2-L four-neck flask equipped with a stirrer, addition funnel, and thermometer: 25 g of aminopropyl-endblocked polydimethylsiloxane with the formula

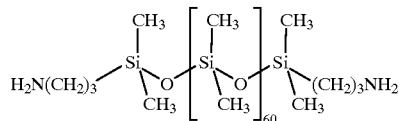

EXAMPLE 3

While operating under a nitrogen current, the following were introduced into a 0.3-L four-neck flask equipped with a stirrer, addition funnel, and thermometer: 25 g of polydimethylsiloxane carrying pendant aminopropyl (NH$_2$ content=0.7459%) with the formula

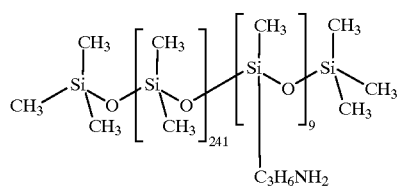

50 mL of xylene, and 4.0 g of the 3-(3',5'-di-tert-butylhydroxyphenyl)propionic acid whose synthesis is described in Example 2. A reaction was run by stirring for 2 hours using azeotropic dehydration conditions. After completion of the reaction, the solvent was distilled out to give 9.2 g of a transparent, viscous, yellowish-brown liquid. This liquid had a viscosity of 200,000 centistokes. Analysis of this liquid by IR spectroscopy and $^{13}$C-NMR spectroscopy confirmed it to be a polyorganosiloxane with the following structural formula.

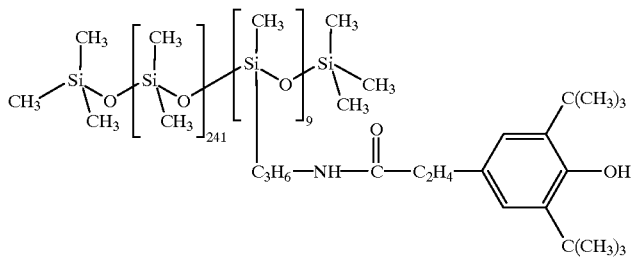

That which is claimed is:

1. A polyorganosiloxane having the formula

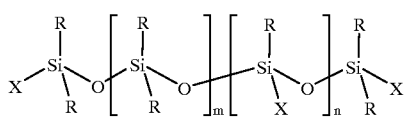

in which R is independently selected from substituted or unsubstituted monovalent hydrocarbon groups, m is an integer having a value of 0 to 500, n is an integer having a value of 0 to 500 and X is selected from a substituted or an unsubstituted monovalent hydrocarbon group selecting from the groups consisting of alkyl, aryl, aralkyl, haloalkyl, alkenyl, and haloalkyl or a phenol group having the formula

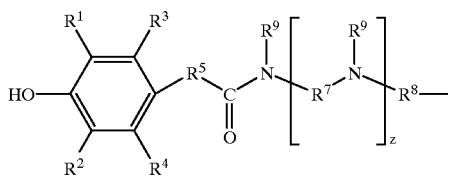

wherein $R^1$, $R^2$, $R^3$, and $R^4$ are selected from the hydrogen atom or $C_1$ to $C_6$ alkyl, at least one $R^1$ or $R^2$ being alkyl, $R^5$, $R^7$ and $R^8$ are selected from $C_2$ to $C_{10}$ alkylene groups, $R^9$ is selected from the hydrogen atom or a $C_1$ to $C_{10}$ monovalent hydrocarbon group and z is an integer having a value of 0 to 10, with the proviso that at least one X group is said phenol group.

2. The polyorganosiloxane according to claim 1, in which at least one of $R^1$ or $R^2$ has the formula $—C(R^{10})_3$ in which $R^{10}$ is an alkyl group having 1 to 3 carbon atoms.

3. The polyorganosiloxane according to claim 2, in which at least one of $R^1$ or $R^2$ is a tert-butyl group.

4. The polyorganosiloxane according to claim 1, wherein R is methyl.

5. The polyorganosiloxane according to claim 2, wherein R is methyl.

6. The polyorganosiloxane according to claim 3, wherein R is methyl.

7. A method for preparing the polyorganosiloxane according to claim 1, said method comprising condensation reacting (A') a polyorganosiloxane of the general formula

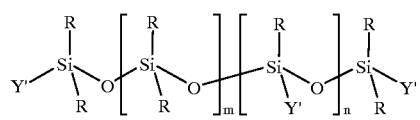

wherein R is independently selected from substituted or unsubstituted monovalent hydrocarbon groups, Y' is selected from substituted or unsubstituted monovalent hydrocarbon groups or an amino group of the formula

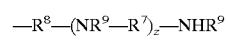

in which $R^9$ is the hydrogen atom or a $C_1$ to $C_{10}$ monovalent hydrocarbon group, $R^7$ and $R^8$ are $C_2$ to $C_{10}$ alkylene groups, m is an integer having a value of 0 to 500, n is an integer having a value of 0 to 500 and z is an integer having a value of 0 to 10, with the proviso that at least one Y' group is said amino group, with (B) a phenol group-containing carboxylic acid having the formula

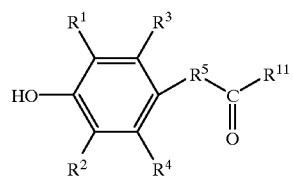

wherein $R^1$, $R^2$, $R^3$, and $R^4$ are selected from the hydrogen atom or $C_1$ to $C_6$ alkyl, at least one $R^1$ or $R^2$ being alkyl, $R^5$ is a $C_2$ to $C_{10}$ alkylene group and $R^{11}$ is a group selected from hydroxyl, alkoxy or halogen.

* * * * *